(12) United States Patent
Kirkland et al.

(10) Patent No.: US 7,980,465 B2
(45) Date of Patent: *Jul. 19, 2011

(54) HANDS FREE CONTACT DATABASE INFORMATION ENTRY AT A COMMUNICATION DEVICE

(75) Inventors: Dustin Kirkland, Austin, TX (US); Ameet M. Paranjape, Cedar Park, TX (US)

(73) Assignee: Nuance Communiccations, Inc., Burlington, MA (US)

( * ) Notice: Subject to any disclaimer, the term of this patent is extended or adjusted under 35 U.S.C. 154(b) by 656 days.

This patent is subject to a terminal disclaimer.

(21) Appl. No.: 12/124,901

(22) Filed: May 21, 2008

(65) Prior Publication Data

US 2008/0221883 A1 Sep. 11, 2008

Related U.S. Application Data (63) Continuation of application No. 11/260,584, filed on Oct. 27, 2005, now Pat. No. 7,395,959.

(51) Int. Cl.
*G06K 5/00* (2006.01)
(52) U.S. Cl. ............... 235/380; 379/88.14; 379/93.15
(58) Field of Classification Search .............. 235/380, 235/382; 379/88.18, 88.28, 93.15, 93.23, 379/185
See application file for complete search history.

(56) References Cited

U.S. PATENT DOCUMENTS

| | | | |
|---|---|---|---|
| 6,832,245 B1 | 12/2004 | Isaacs et al. | |
| 6,961,414 B2 | 11/2005 | Inon et al. | |
| 7,050,551 B2 | 5/2006 | Beith et al. | |
| 7,257,210 B1 | 8/2007 | Henderson | |
| 2005/0069095 A1 | 3/2005 | Fellenstein et al. | |
| 2006/0159242 A1 | 7/2006 | Clark et al. | |
| 2007/0041521 A1 | 2/2007 | Korah et al. | |

OTHER PUBLICATIONS

Wrolstad, Jay, "4G Wireless Voice-to-Text Technology Enters Test Phase", published date Aug. 13, 2001 by wirelessnewsfactor.com. Retrieved online from <http://www.wirelessnewsfactor.com/perl/story/12756.html> on Sep. 21, 2005.
TelephonyWorld, "Z-TEL Launches Personal Voice Assistant—Hands-Free Calling, Computer-Free Emailing and Device-Independent Contact Storage", published Feb. 3, 2003. Retrieved online from <http://www.telephonyworld.com/cgi-bin/news/viewnews.cgi?category=all&id=1044327864> on Sep. 21, 2005.
TelephonyWorld, "LG Electronics Selects Art to Supply Advanced Cell Phone Voice Control", published May 16, 2004. Retrieved online from <http://www.telephonyworld.com/cgi-bin/news/viewnews.cgi?category=all&id=1084682793> on Sep. 21, 2005.
Voicedex Carkit, copyright Hotech. Retrieved online from <http://www.hotech.com.tw/download/carkitdeluxe.pdf> on Sep. 21, 2005.

*Primary Examiner* — Ahshik Kim
(74) *Attorney, Agent, or Firm* — Wolf, Greenfield & Sacks, P.C.

(57) ABSTRACT

A method, system, and program provides for hands free contact database information entry at a communication device. A recording system at a communication device detects a user initiation to record. Responsive to detecting the user initiation to record, the recording system records the ongoing conversation supported between the communication device and a second remote communication device. The recording system converts the recording of the conversation into text. Next, the recording system extracts contact information from the text. Then, the recording system stores the extracted contact information in an entry of the contact database, such that contact information is added to the contact database of the communication device without manual entry of the contact information by the user.

11 Claims, 4 Drawing Sheets

| CONVERSATION 500 | SPEECH -> TEXT -> CONTACT DATABASE 520 |
|---|---|
| ALICE: LET ME GIVE YOU MY CONTACT INFORMATION.<br>BOB: OK LET ME RECORD<br>BOB: RECORD NOW —502<br><DETECT TRIGGER -> CREATE NEW 504<br>RECORDING ENTRY -> START RECORDING<br>WITH MUTE -> "SPEAK THE NAME"><br>BOB: "ALICE DOE" —506<br><DETECT 2 SECOND PAUSE AFTER SPOKEN ENTRY -> CONTINUE RECORDING LOCAL AND REMOTE> —508<br>BOB: CELL NUMBER?<br>ALICE: 5551234567<br>BOB: WORK NUMBER?<br>ALICE: 5559876543<br>ALICE: HEY LET ME GIVE YOU MY EMAIL ADDRESS. IT IS ALICE AT DOMAIN DOT COM<br>BOB: HEY THANKS<br>BOB: RECORD NOW —510<br><DETECT TRIGGER -> STOP RECORDING AND CONVERT RECORDED SPEECH INTO TEXT> —512 | -<br>-<br>-<br><SCRIPTED TAG: NAME> —522<br>-<br>-<br><FIRST_NAME = ALICE; LAST_NAME=DOE><br>—524<br>-<br><DETECT TAG: CELL NUMBER> —526<br><CELL_NUMBER=555-123-4567> —528<br><DETECT TAG: WORK NUMBER?> —530<br><WORK_NUMBER=555-987-6543> —532<br><EXTRACT TAG: EMAIL ADDRESS> —534<br><EMAIL_ADDRESS=ALICE@DOMAIN.COM><br>—536<br>538<br><DETECT END -> AUTOMATICALLY CREATE AND FILL-IN NEW ENTRY IN CONTACT DATABASE> |

*FIG. 5*

| CONVERSATION 600 | SPEECH -> TEXT -> CONTACT DATABASE 620 |
|---|---|
| ALICE: LET ME GIVE YOU MY CELL NUMBER<br>BOB: OK, I'LL RECORD IT * —602<br><DETECT TRIGGER -> CREATE NEW RECORDING ENTRY -> START RECORDING LOCAL ONLY> —604<br>BOB: WHAT IS YOUR CELL NUMBER —606<br>ALICE: 555-123-4567 —608<br>BOB: I HEARD 555-123-4567 —610<br>ALICE: THAT IS CORRECT<br>BOB: HEY THANKS —612<br>BOB: * —614<br><DETECT TRIGGER -> STOP RECORDING AND CONVERT RECORDED SPEECH INTO TEXT> —616 | -<br>-<br>-<br>-<br><DETECT TAG: CELL NUMBER> —626<br><CELL_NUMBER=555-123-4567> —628<br>-<br>-<br>-<br>630<br><DETECT END -> STORE INFORMATION FOR RECORDING ENTRY IN CONTACT DATABASE><br><LACK OF TAG: NAME -> INFER FROM CALLER ID> —622<br>624<br><FIRST_NAME = ALICE; LAST_NAME=DOE> |

HANDS FREE CONTACT DATABASE INFORMATION ENTRY AT A COMMUNICATION DEVICE

CROSS-REFERENCE TO RELATED APPLICATIONS

This application is a continuation of commonly assigned U.S. patent application Ser. No. 11/260,584, filed Oct. 27, 2005, which is hereby incorporated herein by reference.

BACKGROUND OF THE INVENTION

1. Technical Field

The present invention relates in general to improved telephony devices and in particular to providing hands free contact database information entry at a communication device by recording an ongoing conversation and extracting contact database information from the converted text of the ongoing conversation.

2. Description of the Related Art

Many communication devices now include address books provided through a database organized for holding contact information. Contact databases often include the same type of information that a person would include in a paper address book, such as names, business associations, telephone numbers, physical addresses, email addresses, and other contact information.

Many communication devices include multiple buttons or a touch sensitive touch screen, through which a user may select a series of buttons to enter a name or phone number for storage within the contact database. While button selection or touch-screen selection of letters and numbers provides one way for a user to enter information into a contact database, this method is often difficult when the user is trying to enter information and simultaneously hold a conversation through the same communication device. Further, button selection or touch-screen selection of contact information is more difficult when a user is also driving.

In one example, if a user is driving while also carrying on a conversation through a portable communication device and the other participant in the conversation provides the user with a telephone number during the conversation, the user could try to remember the number, could write the number down on paper, or could attempt to select buttons to enter the number into the contact database of the portable communication device. All of these options, however, are limited: In the first, the user may quickly forget the number or address; in the second and third, the user must take at least one hand off the wheel to record the information, either written or through selection of buttons, while driving.

Therefore, in view of the foregoing, there is a need for a method, system, and program for hands-free entry of contact information for storage in a contact database of a communication device.

SUMMARY OF THE INVENTION

Therefore, the present invention provides a method, system, and program for hands free entry of contact information for storage in a contact database of a communication device.

In one embodiment, a recording system at a communication device detects a user initiation to record. Responsive to detecting the user initiation to record, the recording system records the ongoing conversation supported between the communication device and a second remote communication device. The recording system converts the recording of the conversation into text. Next, the recording system extracts contact information from the text. Then, the recording system stores the extracted contact information in an entry of the contact database, such that contact information is added to the contact database of the communication device without manual entry of the contact information by the user.

The communication device detects user initiation to record by detecting a predesignated keystroke, voice command, or other preselected input trigger. Once recording starts, the communication device detects entry of the same input trigger or a different input trigger as a user indication to stop recording.

During recording, the communication device may record both the local voice at the communication device and the remote voice at the second remote communication device, only the local voice, or only the remote voice. In addition, during recording, the communication device may prompt the user to enter a particular type of information and may mute the speaker at the communication device.

In extracting contact information from the text, the communication device detects at least one preselected tag wording within the text, searches the text for at least one portion matching a textual characteristics associated with the preselected tag, and responsive to identifying the portion matching the textual characteristic, assigns the portion to a particular field of the entry of the contact database associated with the preselected tag. In addition, in extracting contact information from the text, the communication device detects a lack of at least one specified tag wording within the text, infers the information for the specified tag wording from other information collectable at the communication device about a second user at the second communication device, and assigns the inferred information to a particular field of the entry of the contact database associated with the tag.

In response to extracting the contact information from the text, the communication device may present the contact information to the user at the communication device or to the second user at the second communication device for approval prior to storing the extracted contact information in the entry of the contact database of the communication device.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is an illustrative diagram depicting one example of a recorded and converted conversation including tag promptings by the local user;

FIG. 6 is an illustrative diagram depicting another example of a conversation where only the local speech is recorded.

DETAILED DESCRIPTION OF THE PREFERRED EMBODIMENT

Figure 1:
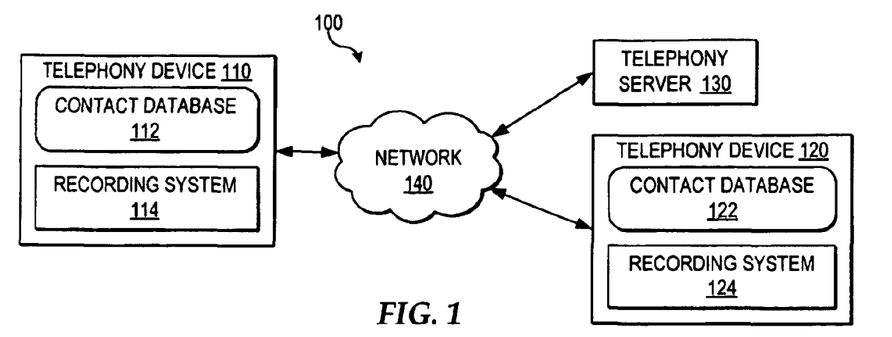
FIG. 1 is a block diagram illustrating one embodiment of a distributed communication network for supporting voice communications.

With reference now to FIG. 1, a block diagram illustrates one embodiment of a distributed communication network for supporting voice communications.

As illustrated, a network 140 facilitates a communicative connection between telephony device 110 and telephony device 120. Each of telephony devices 110 and 120 enable a user at each telephony device to communicate with users at other telephony devices through voice communications and other communication media.

Telephony devices 110 and 120 may include stand alone or portable telephony devices or may be implemented through any computing system communicatively connected to network 140. In addition, telephony devices 110 and 120 may include multiple types of peripheral interfaces that support input and output of communications. While telephony devices 110 and 120 are described with respect to voice based communications, it will be understood that telephony devices 110 and 120 may support multiple types of communication mediums, including, but not limited to, text messaging, electronic mail, video and audio streaming, and other forms of communication.

Network 140 may include multiple types of networks for supporting communications via a single or multiple separate telephony service providers. For example, network 140 may be the public switching telephone network (PSTN) and the Internet. It will be understood that network 140 may also include private telephone networks, other types of packet switching based networks, and other types of networks that support communications.

A telephony service provider may support telephony service through infrastructure within network 140. In addition, a telephony service provider may support telephony service through infrastructure, including server systems, such as a telephony server 130, that communicatively connect to network 140 and support telephony service to one or more telephony devices via network 140.

One or more telephony service providers provide telephony service to each of telephony devices 110 and 120. A user may subscribe to a particular service provider to provide telephony service via network 140 or may communicatively connect to network 140 and then select from among available service providers for a particular call or communication session.

In the example, each of telephony devices 110 and 120 include a contact database, such as contact database 112 and 122. Contact databases 112 and 122 include multiple entries with contact information for individuals, businesses, and other entities. Each entry may include multiple fields of contact data including, but not limited to, first name, last name, title, company, work phone number, home phone number, mobile phone number, email address, home address, and other personal and business data fields. It will be understood that while contact databases 112 and 122 are depicted within telephony devices 110 and 120 respectively, contact databases 112 and 122 may be remotely available from a separate computer system or data storage system via network 140 or a direct connection.

Entries may be added to contact databases 112 and 122 from multiple sources. In one example, a user may manually enter contact data for an entry in a contact database at one of telephony devices 110 and 120 through the input interface of the telephony device. In another example, entries for contact databases 112 and 122 may be downloaded from other systems communicatively connected or directly linked to telephony devices 110 and 120, respectively. Additionally, in the embodiment depicted, recording systems 114 and 124 may record spoken contact data, convert the spoken contact data into text, and parse the text to detect contact for the fields of a new entry in the contact database. By recording a dialog during a telephone call, extracting the contact data from the dialog, and writing the contact data into the fields an entry of a contact database of the telephony device, the contact information is then accessible from the contact database at a later time without requiring manual entry of the information. It will be understood that while recording systems 114 and 124 are depicted as components of telephony devices 110 and 120 respectively, recording systems 114 and 124 may be remotely accessible from a separate computer system or data storage system via network 140 or a direct connection.

Figure 2:
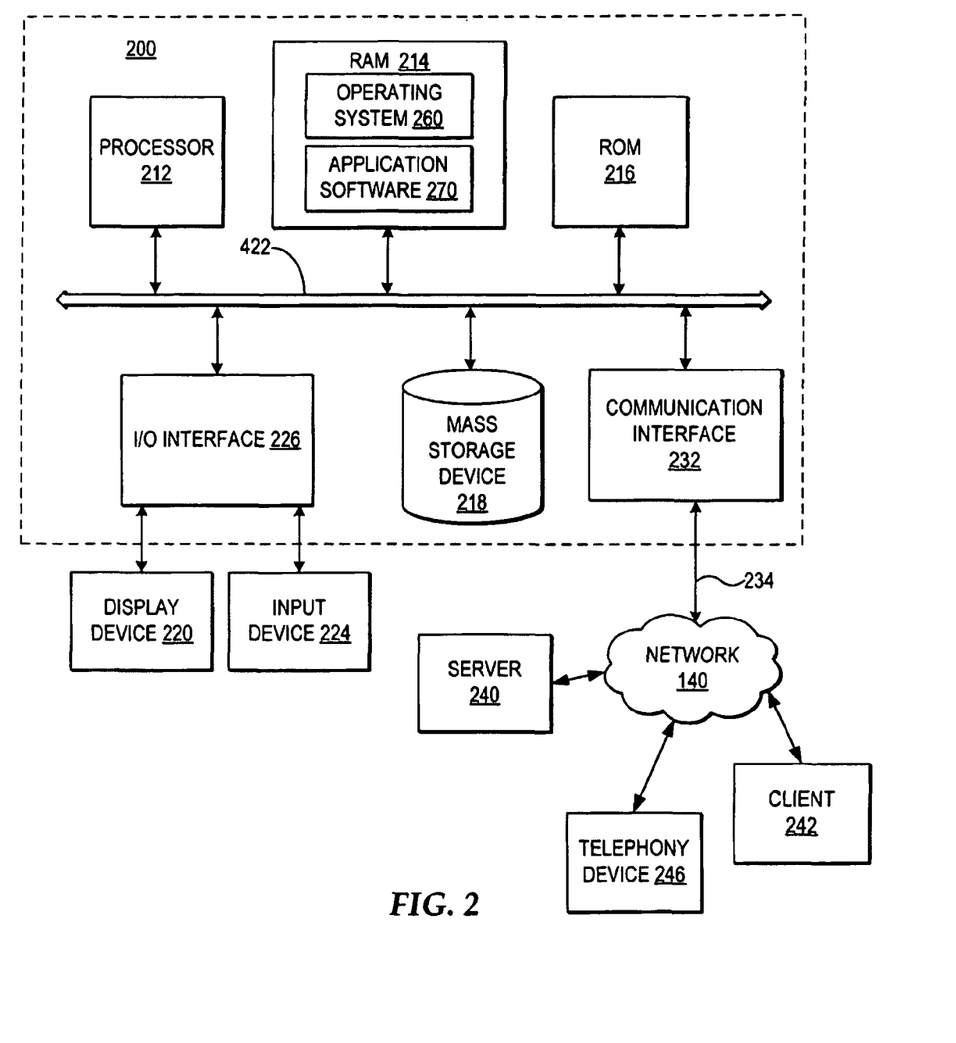
FIG. 2 is a block diagram depicting one embodiment of a computing system through which the telephony device, telephony server, of network systems of the present method and program product may be implemented.

Referring now to FIG. 2, a block diagram depicts one embodiment of a computing system through which the telephony device, telephony server, of network systems of the present method and program product may be implemented. The present invention may be executed in a variety of systems, including a variety of computing systems and electronic devices.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as an email server, computer system 200 may include multiple processors designed to improve network servicing power.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. Operating system 260 may provide a graphical user interface (GUI) to the user. In one embodiment, application software 270 contains machine executable instructions for controlling telephony communications that when executed on processor 212 carry out the operations depicted in the flowcharts of FIG. 7 and other operations described herein. Alternatively, the steps of the present invention might be performed by specific hardware components that contain hardwired logic for performing the steps, or by any combination of programmed computer components and custom hardware components.

The recording system of the present invention may be provided as a computer program product, included on a machine-readable medium having stored thereon the machine executable instructions used to program computer system 200 to perform a process according to the present invention. The term "machine-readable medium" as used herein includes any medium that participates in providing instructions to processor 212 or other components of computer system 200 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 400 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the present invention may be downloaded as a computer program product, wherein the program instructions may be transferred from a remote computer such as a server 240 or client system 242 to requesting computer system 200 by way of data signals embodied in a carrier wave or other propagation medium via a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 140.

Network link 234 and network 140 both use electrical, electromagnetic, or optical signals that carry digital data streams. The signals through the various networks and the signals on network link 234 and through communication interface 232, which carry the digital data to and from computer system 200, are forms of carrier waves transporting the information.

When implemented as a telephony device, communication interface 232 may support a single or multiple communication channels with a single or multiple other telephony devices or other communication devices, such as telephony device 246, via network 140.

When implemented as a telephony server or network server, computer system 200 may include multiple communication interfaces accessible via multiple peripheral component interconnect (PCI) bus bridges connected to an input/output controller. In this manner, computer system 200 allows connections to multiple network computers via multiple separate ports.

In addition, computer system 200 typically includes multiple peripheral components that facilitate communication. These peripheral components are connected to multiple controllers, adapters, and expansion slots, such as input/output (I/O) interface 226, coupled to one of the multiple levels of bus 222. For example, input device 224 may include, for example, a microphone, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, but may also include other output interfaces, such as an audio output interface. In alternate embodiments of the present invention, additional input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
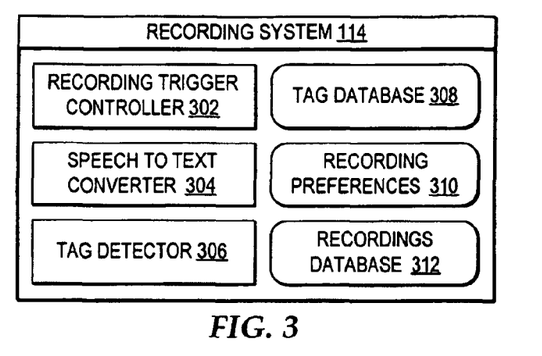
FIG. 3 is a block diagram illustrating one embodiment of components of a recording controller within a portable electronic communication device.

With reference now to FIG. 3, a block diagram illustrates one embodiment of components of a recording controller within a portable electronic communication device. As illustrated, recording system 114 includes multiple components and data storage elements. It will be understood that in other embodiments, additional or other components and data storage elements may be included in recording system 114 and that telephony device 110 may facilitate access to additional components and data storage elements for recording system 114 from other systems, through a direct or network connection.

In the example, recording system 114 includes recording preferences 310. Recording preferences 310 specify a user's preferences for recording ongoing conversations and extracting contact data information from those ongoing conversations. In one embodiment, a user may select recording preferences 310 through a user interface of telephony device 110. In another embodiment, a user may download recording preferences 310 to telephony device 110 from another system or access recording preferences 310 from a network accessible location, such as telephony server 130. In addition, it will be understood that user or enterprise selection of recording preferences 310 may be performed through other available interfaces of telephony device 110.

In addition, in the example, recording system 114 includes a recording trigger controller 302. Recording trigger controller 302 detects triggers for recording ongoing conversations and controls set up of a new recording entry in a recordings database 312 and recording of the ongoing conversation into the new recording entry of recordings database 312. In one example, recording trigger controller 302 detects entry of a button specified by a user in recording preferences 310 as a trigger. Triggers may include, for example, a keystroke entry or a voice entry.

Further, in the example, recording system 114 includes a speech to text converter 304. Speech to text converter 304 converts the recordings of ongoing conversations from speech into text. In one example, speech to text converter 304 converts recordings of ongoing conversations from speech to text as the recording is occurring. In another example, speech to text converter 304 converts recordings of ongoing conversations from speech to text once the recording is concluded or upon detection of a user entered trigger to convert.

Recording system 114 also includes a tag detector 306. Tag detector 306 scans both speech and text and identifies speech or text that matches tags set within a tag database 308. Tag detector 306 or another accessible controller may automatically set tags within tag database 308. In addition, a user may specify tags within tag database 308 through a same or different interface from the interface for setting recording preferences 310.

A tag within tag database 308 or recording preferences 310 may include, for example, "name", "address", "business number" or other identifiers that are matched with fields specified for contact database 112. For example, the tag "name" may be matched with the fields FIRST_NAME and LAST_NAME. In another example, the tag "work number" may be matched with the field WORK_NUMBER.

In addition, a tag within tag database 308 may include an associated characteristic of the type of information or pattern of the information typically associated with the tag. For example, the tag "name" may be specified to typically include two words, but would also include other characteristics, such as a name prefix of "Mr", "Mrs" or "Miss" or a name suffix of "Jr" or "3$^{rd}$". In another example, the tag "business number" may be specified to typically include either seven or ten digits unless the first digit is a "0" or other indicator of a country prefix.

Thus, as tag detector 306 identifies tags within recorded conversations, tag detector then identifies the unique information associated with the tag and assigns the information to the associated field or fields. For example, if tag detector 306 detects a text tag of "email" within the converted text of a recorded conversation, then tag detector 306 searches the text before and after the tag for text matching the characteristic pattern of an email address, such as a phrase ending in "dot corm" or "dot org", and assigns the identified unique email address to the field EMAIL_ADDRESS.

In addition to detecting tags, tag detector 306 may detect the lack of presence of particular tags designated within tag database 308 as required or requested. For example, tag database 308 may include the tag "name" marked as required, and set the default for the tag to the caller identification if tag detector 306 detects the lack of presence of the tag "name" within a particular conversation.

Once tag detector 306 detects the end of a recording, recording preferences 310 may specify the next actions to be taken by tag detector 306. For example, if recording preferences 310 specify automatic entry creation, then tag detector 306 will automatically create a new database entry within contact database 112 and automatically fill in the fields of the new database entry with the assigned information.

Figure 4:
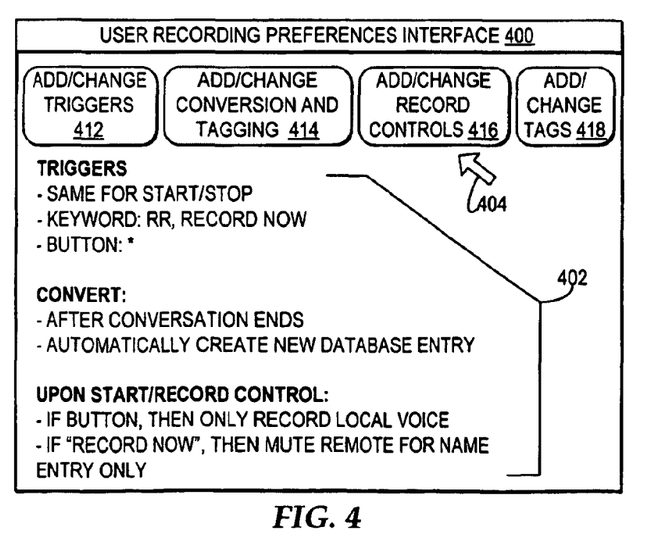
FIG. 4 is an illustrative diagram depicting a user interface for selection of recording preferences at a particular electronic communication device.

Referring now to FIG. 4, an illustrative diagram depicts a user interface for selection of recording preferences at a particular electronic communication device. In the example, a display interface 400 includes options for updating or changing current recording preferences illustrated at reference numeral 402. In the example, the user has selected preferences for triggers, conversion, and recording control. It will be understood that a user may specify additional and other types of preferences for performance of recording system 114.

In particular, in the example depicted at reference numeral 402, current recording preferences specify triggers of spoken keywords and buttons, to apply to starting and stopping and recording of an ongoing conversation. Through using positioning of cursor 404 or other input, a user may select button 412 to add or change the current triggers. For example, a user may select to add a different voice trigger for stopping a recording. It will be understood that a user may specify triggers dependent upon the types of detectable inputs at input interfaces of telephony device 110. It is important to note that a user may select spoken keyword triggers, and thus trigger the input of information into a contact database of a telephony device hands free through voice driven commands and through voice recording. Alternatively, a user may select a trigger button that is convenient for the user to press and trigger the input of information into a contact database of a telephony device hands free through voice driven commands and through voice recording.

In addition, in the example, current recording preferences specify conversion and tagging after a conversation ends. A user may select button 414 to add or change the conversion and tagging time point. For example, a user may select button 414 to then select a different conversion point dependent upon the identity of the other participant in the call or type of call, such as a long distance call. Further, a user may select a different conversion time point such as while the recording of the ongoing conversation is occurring or at the conclusion of the recording of the ongoing conversation. It will be understood that a user may select from among those conversion preferences available and that a user may select multiple conversion preferences.

Additionally, the conversion and tagging preferences indicates a preference for tag detector 306 to automatically create a new database entry for information parsed from the converted and tagged conversation. In another example, a user may select button 414 and select a preference to automatically prompt the local user or remote user with the tagged conversation and obtain approval prior to creating a new database for the information.

Further, in the example, current recording preferences specify to control recording upon a start trigger where if a button is the trigger then recording should only include the local voice and if the trigger is the vocal trigger of "RECORD NOW", then recording trigger controller 302 should mute the output of the local voice to the remote telephony device for the local user to speak the name into the recording of the ongoing conversation. A user may also select button 416 to add or change the recording controls. It will be understood that a user may select one or more control preferences based on selected triggers and types of recordings available.

With reference now to FIG. 5, an illustrative diagram depicts one example of a recorded and converted conversation including tag promptings by the local user. As illustrated at reference numeral 500, a recorded conversation is detected with the steps performed by recording trigger controller 302 indicated within textual marks of "<" and ">". In the example, network 140 supports a conversation between a user "Alice" and a user "Bob". The telephony device used by Bob records portions of the conversation between Alice and Bob. In particular, the conversation begins with Alice wanting to give Bob her contact information.

In the example, Bob would like to record the contact information rather than manually entering the information or writing the information down separately, so Bob speaks the command "RECORD NOW", as illustrated at reference numeral 502. Recording trigger controller 302 detects the voice command of "RECORD NOW" because recording trigger controller 302 monitors a conversation for particular voice triggers or for other specified triggers. As illustrated at reference numeral 504, once recording trigger controller 302 detects the start trigger of "RECORD NOW", recording trigger controller 302 creates a new recording entry within recordings database 312, starts recording the conversation with Bob's local speech muted from broadcast to Alice's telephony device, and plays a prompt to Bob to "speak the name". Bob speaks "Alice Doe", as illustrated at reference numeral 506. Next, as illustrated at reference numeral 508, recording trigger controller 302 detects Bob speak following the prompt and detects a pause of longer than two seconds in Bob's speech. Upon detection of the pause after the spoken entry, recording trigger controller 302 returns volume to the speaker and continues recording both Bob's local speech and Alice's remote speech.

Next in the example, Bob begins to vocally prompt Alice to speak certain pieces of information. In the example, Bob prompts Alice to speak a cell number and a work number. In addition, in the example, Alice unilaterally offers her email address and then speaks her email address. Bob concludes the recording of contact information by speaking "RECORD NOW" again, as illustrated at reference numeral 510. As illustrated at reference numeral 512, upon detection of the trigger "RECORD NOW", recording trigger controller 302 stops the recording and converts the recorded speech into text. Then, as illustrated at reference numeral 520, tag detector 306 parses the text to detect tags and information associated with tags.

As illustrated at reference numeral 322, tag detector 306 first detects a scripted tag of "name" included in the prompt by recording trigger controller 302. Tag detector 306 retrieves from tag database 308 any fields associated with the tag "name" and identifies a field "FIRST_NAME" and "LAST_NAME". As illustrated at reference numeral 324, tag detector 306 associates the first word of the converted text following the scripted tag with the field FIRST_NAME and associates the second word of the converted text with the field LAST_NAME. It will be understood that in other embodiments, where a single tag includes multiple associated fields for multiple words, tag detector 306 may prompt the user to approve the association or may mark the fields in a particular manner to prompt the user to check the matches associations of fields with text.

Next, as illustrated at reference numeral 326, tag detector 306 next detects from Bob's speech the tag of "cell number". Tag detector 306 retrieves from tag database 308 the characteristic of a "cell number" of a consecutive string of seven to ten numbers and also any fields associated with the tag "cell number", which in the example is the field CELL_NUMBER. Tag detector 306 searches for a converted text number, identifies the number 5551234567 matching the characteristic string pattern following the tag and associates the number with the field CELL_NUMBER. Similarly, as depicted at reference numeral 330, tag detector 306 detects from Bob's speech the tag of "work number", retrieves the associated field of WORK_NUMBER from tag database 308 and associates the next number in the converted text with the field WORK_NUMBER, as illustrated at reference numeral 332.

Thereafter, as illustrated at reference numeral 334, tag detector 306 detects in the converted text spoken by Alice the tag "email" and retrieves, from tag database 308, the pattern of data that identifies information associated with the tag "email". In the example, tag detector 306 identifies the spoken text following the tag that matches the pattern of an email address of "alice at domain dot com" and converts the converted text into the pattern of the email address associated with field EMAIL_ADDRESS as illustrated at reference numeral 336.

Finally, as illustrated at reference numeral 338, tag detector 306 detects the end of the recording. In the example, tag detector 306 automatically triggers creation of a new entry in contact database 112 and automatically fills in the fields of the new entry according to the information matched with each field identifier. It will be understood that in filling in the new entry in contact database 112, tag detector 306 may prompt the local user and may prompt the remote user to verify the converted information. Alternatively, tag detector 306, at the end of the recording, may store the converted information with the recording in recordings database 312.

Referring now to FIG. 6, an illustrative diagram depicts another example of a conversation where only the local speech is recorded. In particular, in the example, only the local side of the conversation is recorded. By recording only the local user side of the conversation, the local user can hear contact information from the remote user, repeat the contact information in a format understood by the local user's portable electronic communication device, and at the same time that the local user repeats the contact information, the remote user hears the local user's speech and can verify the accuracy of the contact information as understood by the local user.

As illustrated at reference numeral 600, a recorded conversation is detected with the steps performed by recording trigger controller 302 indicated within textual marks of "<" and ">". In the example, network 140 supports a conversation between a user "Alice" and a user "Bob". The telephony device used by Bob records portions of the conversation between Alice and Bob, however, and in particular only records those portions of the conversation spoken by Bob. In particular, the conversation begins with Alice wanting to give Bob her contact information. Bob enters a key of "*" to trigger recording, as illustrated at reference numeral 602. Based on the recording preferences illustrated in FIG. 4, triggering recording using a button triggers recording of only the local side of the conversation. Thus, when recording trigger controller 302 detects the key entry of "*", as illustrated at reference numeral 604, recording trigger controller 302 create a new recording entry within recordings database 312 and begins recording only those portions of the conversation spoken by Bob into the new recording entry.

In particular, in the example, recording trigger controller 302 records Bob's question of "What is your cell number" indicated at reference numeral 606, his statement of "I heard 5551234567" indicated at reference numeral 610 and his statement of "Hey thanks" indicated at reference numeral 612. Recording trigger controller 302 does not record, however, Alice's statements from the remote telephony device of "5551234567" indicated at reference numeral 608 and of "that is correct" indicated at reference numeral 611. Bob then concludes the recording of the conversation by entering a key of "*", as indicated at reference numeral 614. Upon detection of the trigger to end the recording, as indicated at reference numeral 616, recording trigger controller 302 stops the recording and converts the recorded speech into text.

Next, as illustrated at reference numeral 620, tag detector 306 parses the text to detect tags and information associated with tags.

First, in the example, a user may select a preference that if no name tag is detected in a recording, then tag detector 306 should infer that the caller identification should be designated in the fields associated with the name. In the example, once tag detector 306 reaches the end of the converted text recording and detects that no name tag was included in the converted text, then as illustrated at reference numerals 622 and 624, tag detector 306 infers that the name for the entry is the same as the caller identification and assigns the fields associated with the name tag with the caller identification.

Next, in the example tag detector 306 detects the tag "cell number" as illustrated at reference numeral 626. Upon detection of the tag "cell number", tag detector locates numbers in the text matching the expected pattern for the tag and assigns the numbers "5551234567" to the field CELL_NUMBER as illustrated at reference numeral 628.

Finally, as illustrated at reference numeral 630, tag detector 306 detects the end of the recording. In the example, tag detector 306 automatically triggers creation of a new entry in contact database 112 and automatically fills in the fields of the new entry according to the information matched with each field identifier, as previously described.

Figure 7:
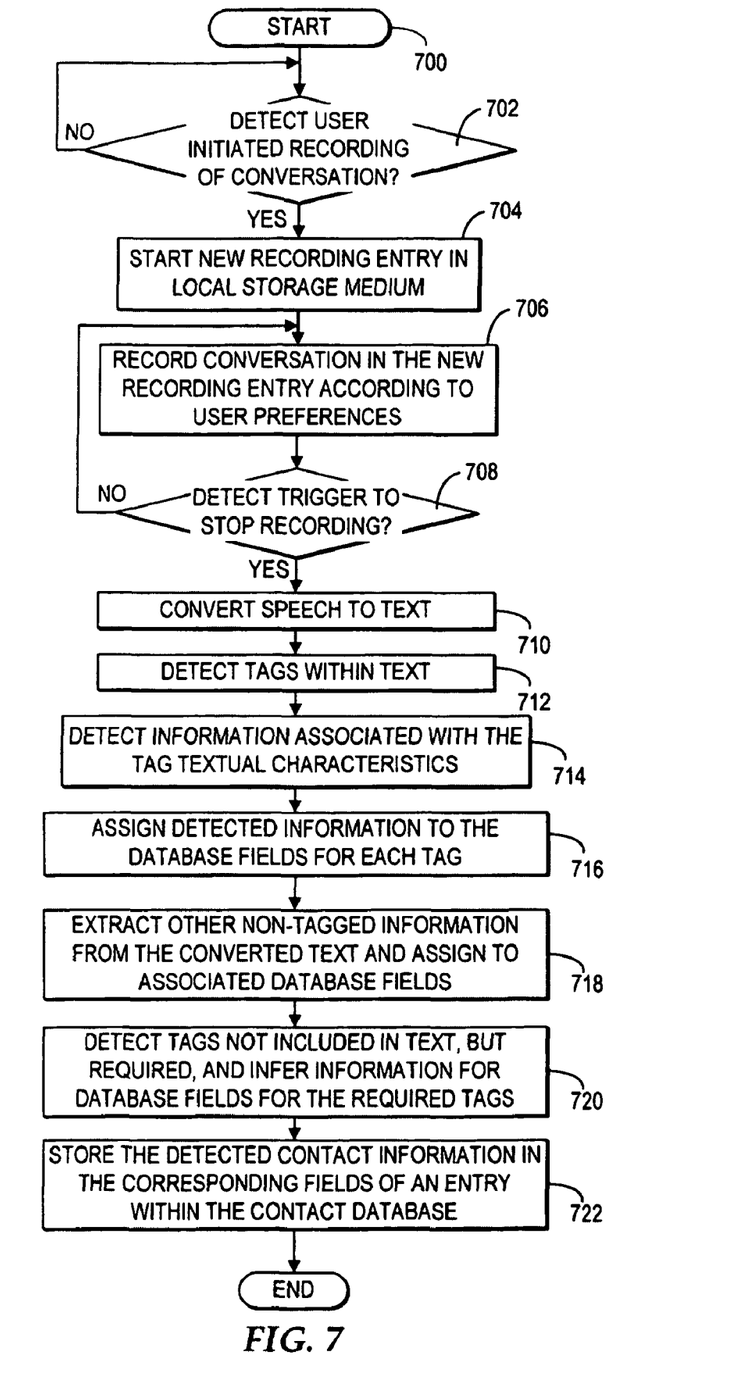
FIG. 7 is a high level logic flowchart depicts a process and program for controlling hands free entry of contact database information.

With reference now to FIG. 7, a high level logic flowchart depicts a process and program for controlling hands free entry of contact database information. As illustrated, the process starts at block 700 and thereafter proceeds to block 702. Block 702 depicts a determination whether the recording controller detects a user initiated recording of a conversation. If the recording controller detects a user initiated recording of a conversation, then the process passes to block 704. Block 704 illustrates starting a new recording entry in the local storage medium. Next, block 706 depicts recording the conversation in the new recording entry according to user preferences. In particular, user preferences may indicate a preference to only record the local side of the conversation. Thereafter, block 708 illustrates a determination whether the recording controller detects a trigger to stop recording. If the recording controller does not detect a trigger to stop recording, then the process returns to block 706 and the recording controller continues to record the conversation. Otherwise, at block 708, if the recording controller does detect a trigger to stop recording, then the process passes to block 710.

Block 710 depicts converting the recording conversation speech into text. Next, block 712 illustrates detecting the contact tags within the text. Thereafter, block 714 depicts detecting the information associated with the tag characteristics of detected tags. Next, block 716 illustrates assigning the associated info to the fields for each tag. Thereafter, block 718 depicts extracting other non-tagged information from the converted text and associated the non-tagged information with a contact database entry field. Further, block 720 illustrates detecting those tags required, but not included in the text and inferring or requesting for each field associated with the required tags. Thereafter, block 722 depicts storing the detected contact information in the corresponding fields of a newly created contact database entry, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for entry of contact information for storage in a contact database of a communication device, comprising:
   a communication device communicatively connected to a communication network, further comprising:
   means, responsive to detecting a user initiation at said communication device to record an ongoing conversation between said communication device and a second remote communication device, for muting output of a local voice spoken at said communication device from passing to said second remote communication device, for prompting a user at said communication device to speak the contact name for said contact information, and for recording said local voice spoken at said communication device as said contact name;
   means, responsive to detecting a pause in said local voice spoken at said communication device for at least a specified time, for broadcasting said local voice spoken at said communication device to said second remote communication device and for recording said ongoing conversation supported between said communication device and said second remote communication device;
   means for automatically converting said recording of said contact name and said recording of said ongoing conversation into text at said communication device;
   means for automatically extracting said contact name and at least one other type of contact information from said text at said communication device; and
   means for storing said extracted at least one other type of contact information in an entry under said contact name in said contact database of said communication device, wherein contact information is entered into said contact database of said communication device without manual entry of said contact information by a user at said communication device.

2. The system according to claim 1, said communication device further comprising:
   means for detecting said user initiation at said communication device to record from detection of at least one of a predesignated keystroke and voice command.

3. The system according to claim 1, said communication device further comprising:
   means for only converting said recording of said conversation into text responsive to detecting a user entry that triggers termination of said recording.

4. The system according to claim 1, wherein said means for recording said ongoing conversation supported between said communication device and said second remote communication device further comprises:
   means for recording only a local voice spoken at said communication device.

5. The system according to claim 1, wherein said means for extracting said contact name and at least one other type of contact information from said text further comprises:
   means for detecting at least one preselected tag wording within said text;
   means for searching said text for at least one portion matching a textual characteristic associated with said preselected tag; and
   means, responsive to identifying said portion matching said textual characteristic, for assigning said portion to a particular field of said entry of said contact database associated with said preselected tag.

6. The system according to claim 1, wherein said means for extracting said contact name and at least one other type of contact information from said text further comprises:
   means for detecting a lack of at least one specified tag wording within said text;
   means for inferring information for said specified tag wording from other information collectable at said communication device about a second user at said second communication device; and
   means for assigning said inferred information to a particular field of said entry of said contact database associated with said tag.

7. The system according to claim 1, said communication device further comprising:
   means, responsive to extracting said contact information from said text, for presenting said contact information to at least one of said user at said communication device and a second user at said second remote communication device for approval prior to storing said extracted contact information in said entry of said contact database of said communication device.

8. A program for entry of contact information for storage in a contact database of a communication device, said program embodied in a computer-readable medium, said program comprising computer-executable instructions which cause a computer to perform the steps of:
   controlling muting of output of a local voice spoken at said communication device from passing to a second remote communication device, prompting a user at said communication device to speak the contact name for contact information, and recording said local voice spoken at said communication device as said contact name, responsive to detecting a user initiation at said communication device to record an ongoing conversation between said communication device and a second remote communication device;
   controlling broadcast of said local voice spoken at said communication device to said second remote communication device and recording of said ongoing conversation supported between aid communication device and said second remote communication device, responsive to detecting a pause in said local voice spoken at said communication device for at least a specified;

controlling conversion of said recording of said contact name and said recording of said ongoing conversation into text;

controlling extraction of extracting said contact name and at least one other type of contact information from said text; and controlling storage of said extracted at least one other type of contact information in an entry under said contact name in said contact database of said communication device.

9. The program according to claim 8, wherein controlling recording of said ongoing conversation supported between said communication device and said second remote communication device further comprises computer-executable instructions which cause said computer to perform the step of:

recording only a local voice spoken at said communication device.

10. The program according to claim 8, wherein controlling extraction of said contact name and at least one other type of contact information from said text further comprises computer-executable instructions which cause said computer to perform the steps of:

detecting at least one preselected tag wording within said text;

searching said text for at least one portion matching a textual characteristic associated with said preselected tag; and responsive to identifying said portion matching said textual characteristic, assigning said portion to a particular field of said entry of said contact database associated with said preselected tag.

11. The program according to claim 8, wherein controlling extraction of said contact name and at least one other type of contact information from text further comprises computer-executable instructions which cause said computer to perform the steps of:

detecting a lack of at least one specified tag wording within said text;

inferring information for said specified tag wording from other information collectable at said communication device about a second user at said second communication device; and assigning said inferred information to a particular field of said entry of said contact database associated with said tag.

* * * * *